United States Patent [19]

Thompson

[11] 4,063,497

[45] Dec. 20, 1977

[54] APPARATUS FOR MAKING CREPES OR THE LIKE

[76] Inventor: James R. Thompson, 3348 Oak Hollow, Oklahoma City, Okla. 73120

[21] Appl. No.: 659,674

[22] Filed: Feb. 20, 1976

[51] Int. Cl.² ............................................. A47J 37/10
[52] U.S. Cl. ................................................. 99/423; 99/427
[58] Field of Search ................. 99/423, 352, 373, 377, 99/391–392, 399, 422, 424–425, 427, 431, 443; 74/25

[56] References Cited

U.S. PATENT DOCUMENTS

| 736,155 | 8/1903 | Rifkin et al. | 99/377 |
| 2,962,985 | 12/1960 | Castronuovo | 99/431 X |
| 3,193,663 | 7/1965 | Budzich et al. | 99/391 X |
| 3,225,716 | 12/1965 | Krooss et al. | 99/423 |
| 3,349,726 | 10/1967 | Fono | 99/431 X |
| 3,367,260 | 2/1968 | Freyburger | 99/377 X |

Primary Examiner—Harvey C. Hornsby
Assistant Examiner—Arthur O. Henderson
Attorney, Agent, or Firm—Dunlap, Codding & McCarthy

[57] ABSTRACT

An apparatus for use with a crepe pan for making crepes or the like, the apparatus generally comprising a pan support frame for supporting the crepe pan and means for moving the pan support frame in a first direction to a handling position where the pan is adjacent to a heating unit, and in a second direction to a cooking position where the pan is astride the heating unit, the pan support frame being maintained in the handling position for a first predetermined time and in the cooking position for a second predetermined time.

8 Claims, 7 Drawing Figures

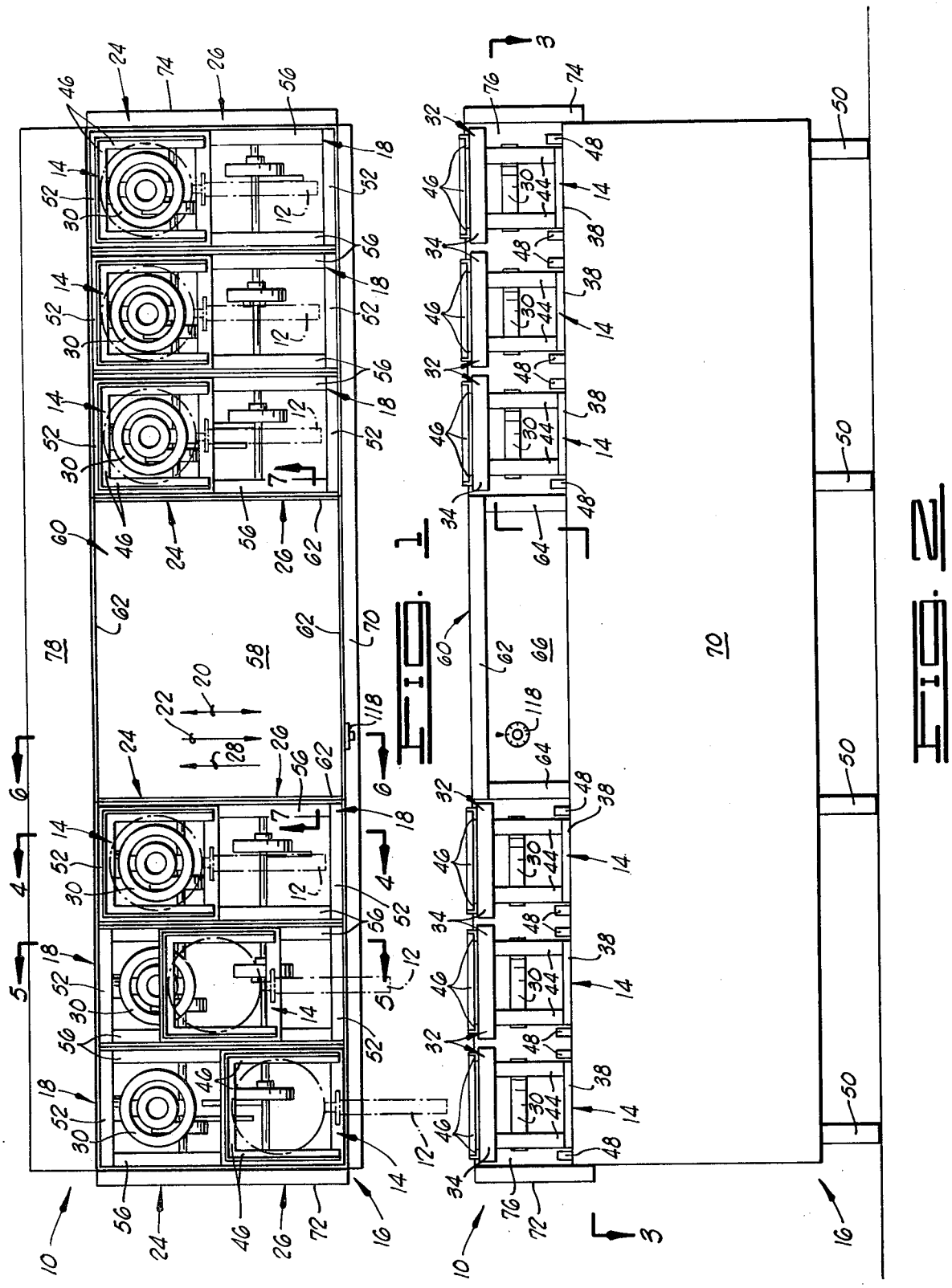

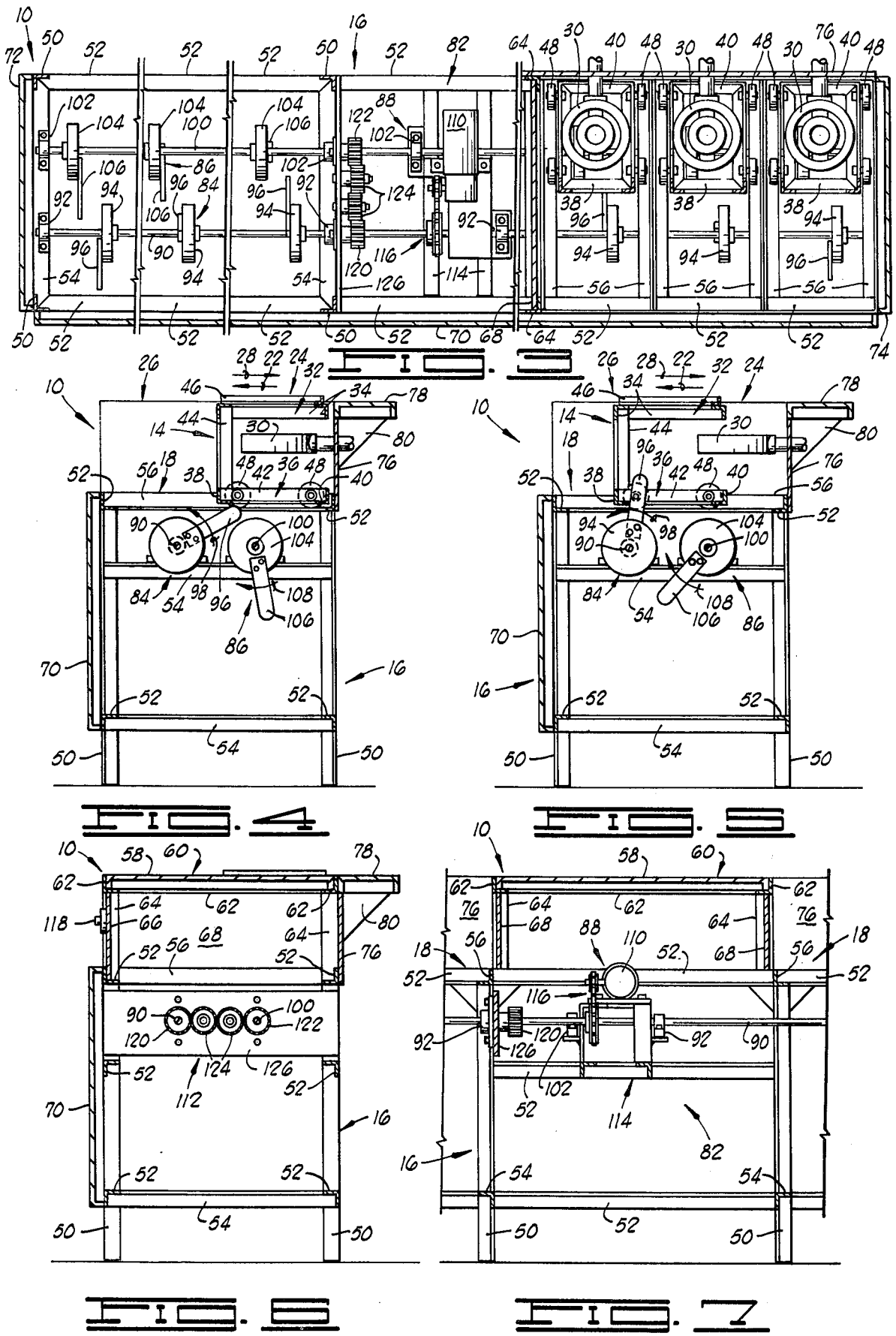

APPARATUS FOR MAKING CREPES OR THE LIKE

BACKGROUND OF THE INVENTION

1. Field of the Invention

This invention relates generally to improvements in apparatus for making crepes or the like, and, more particularly, but not by way of limitation, to an apparatus for making crepes or the like, wherein the crepe pan is supported on a pan support frame which is movable in a first direction to a handling position where the pan is adjacent to a heating unit and in a second direction to a cooking position where the pan is astride the heating unit, with the pan support frame being maintained in the handling position for a first predetermined time and in the cooking position for a second predetermined time.

2. Description of the Prior Art

In the past, apparatus for making crepes or the like have been designed so that the various cooking surfaces are moved in a single direction in a generally circulating manner through the various stages of production. The apparatus described in U.S. Pat. Nos. 2,962,985; 3,349,726 and 3,340,793 are typical of the class of crepe making apparatus wherein the cooking surfaces are moved in a generally circular pattern. The apparatus described in U.S. Pat. No. 2,786,430 is typical of the class of crepe making apparatus wherein the cooking surfaces are moved in a single direction in a circulating manner over a non-circular path. Related apparatus is shown in U.S. Pat. No. 1,543,380.

SUMMARY OF THE INVENTION

An object of the invention is to provide an apparatus for use with a crepe pan for making crepes or the like wherein a pan support frame is utilized for supporting a crepe pan for movement in a generally reciprocating manner along a horizontal path of movement.

Another object of the invention is to provide an apparatus for use with a crepe pan for making crepes or the like wherein the pan support frame is movable in a generally reciprocating manner between a cooking position where the pan is astride a heating unit and a handling position where the pan is adjacent to the heating unit.

Still another object of the invention is to provide an apparatus for use with a crepe pan for making crepes or the like wherein the pan support frame is maintained in a handling position for a first predetermined time and in a cooking position for a second predetermined time.

A further object of the invention is to provide an apparatus for use with a crepe pan for making crepes or the like which is simple in construction and economical to manufacture.

A still further object of the invention is to provide an apparatus for use with a crepe pan for making crepes or the like which is simple and economical in operation and maintenance.

Other objects and advantages of the invention will be evident from the following detailed description when read in conjunction with the accompanying drawings which illustrate the preferred embodiment of the invention.

BRIEF DESCRIPTION OF THE DRAWINGS

FIG. 1 illustrates the top view of an apparatus for making crepes or the like constructed in accordance with the preferred embodiment of the invention.

FIG. 2 illustrates the front elevational view of the crepe making apparatus shown in FIG. 1.

FIG. 3 illustrates the cross sectional view of the crepe making machine taken along the line 3—3 in FIG. 2.

FIG. 4 illustrates the cross sectional view of the crepe making machine taken along the line 4—4 in FIG. 1.

FIG. 5 illustrates the cross sectional view of the crepe making machine taken along the line 5—5 in FIG. 1.

FIG. 6 illustrates the cross sectional view of the crepe making machine taken along the line 6—6 in FIG. 1.

FIG. 7 illustrates the cross sectional view of the crepe making machine taken along the line 7—7 in FIG. 1.

DESCRIPTION OF THE PREFERRED EMBODIMENT

Referring to the figures in general and to FIGS. 1 and 2 in particular, shown therein and designated by the general reference number 10 is an apparatus for use with a crepe pan 12 (shown in phantom in FIG. 1) for making crepes or the like, constructed in accordance with the preferred embodiment of the present invention. In the preferred embodiment, the crepe making apparatus 10 is comprised generally of a plurality of pan support frames 14 for supporting the crepe pan 12, a frame 16 having a plurality of substantially horizontal portions 18 supporting the pan support frame 14 for movement along a horizontal path of movement 20 in a first direction 22 from a cooking position 24 to a handling position 26 and in a second direction 28 substantially opposite to the first direction 22 from the handling position 26 to the cooking position 24, and a plurality of heating units 30 each connected to the frame 16 in a position to heat one of the crepe pans 12 when the associated pan support frame 14 is in the cooking position 24.

As can be seen most clearly in FIGS. 4 and 5, each of the pan support frames 14 is comprised generally of an upper rectangular portion 32 formed from four angle bars 34 and a lower rectangular portion 36 formed from a first angle bar 38 and a second angle bar 40 connected thereto via a pair of connecting angle bars 42, the upper and lower rectangular portions 32 and 36, respectively, being maintained in parallel, spaced apart relationship via a pair of vertical angle bars 44. The upper rectangular portion 32 has three angle bars 46 connected thereto in substantially a C-shape, the angle bars 46 cooperating to prevent the crepe pan 12 from being inadvertantly dislodged from the pan support frame 14 during operation of the crepe making apparatus 10. The lower rectangular portion 36 has a plurality of wheels 48 connected thereto to rollingly support the pan support frame 14 for movement along the horizontal path of movement 20 in the first and second directions 22 and 28, respectively, on an associated horizontal portion 18 of the frame 16.

The frame 16 is constructed from conventional angle bar materials so as to provide a stable base for the various operating members of the crepe making apparatus 10. More particularly, the frame 16 has a plurality of vertical legs 50, a plurality of horizontal connecting bars 52, and a plurality of horizontal cross braces 54, all of which are connected by conventional means such as welding. Each of the horizontal portions 18 is comprised of a pair of track members 56 connected in parallel, spaced apart relationship between the upper pair of horizontal connecting bars 52. The frame 16 also includes a horizontal work surface 58 removably positioned in an upper rectangular portion 60 formed from four angle bars 62 which are spaced vertically above the track members 56 by four vertical bars 64. The frame 16 is provided with a front cover 66 and a pair of side covers 68 connected between the vertical bars 64; a front cover 70, a left side cover 72, a right side cover 74 and a rear cover 76 connected between the legs 50; and a rear table-like extension 78 extending the length of the frame 16 and connected thereto via a plurality of braces 80.

The crepe making apparatus 10 also includes a prime mover assembly 82 for moving the pan support frames 14 in the first direction 22 from the cooking position 24 to the handling position 26 and in the second direction 28 from the handling position 26 to the cooking position 24, the prime mover assembly 82 being constructed to maintain the pan support frame 14 in the cooking position 24 for a first predetermined time and in the handling position 26 for a second predetermined time. More particularly, the prime mover assembly 82 includes a first cam assembly 84 for moving the pan support frames 14 in the first direction 22 from the cooking position 24 to the handling position 26, a second cam assembly 86 for moving the pan support frames 14 in the second direction 28 from the handling position 26 to the cooking position 24, and a motor assembly 88 which coordinates the operation of the first and second cam assemblies 84 and 86, respectively, so that each of the pan support frames 14 is maintained in the handling position 24 for the first predetermined time and in the cooking position 26 for the second predetermined time.

The first cam assembly 84 is comprised of: a first shaft 90 rotatably mounted on the frame 16 substantially beneath the handling position 26 of each of the pan support frames 14 via a plurality of bearing assemblies 92, so as to be rotatable about a horizontal axis intersecting substantially perpendicularly the downward vertical projection of the path of movement 20 of the pan support frames 14; and a plurality of first cams 94 each axially mounted on the first shaft 90 substantially beneath the handling position 26 of a selected one of the pan support frames 14. Each of the first cams 94 has a lobe 96 extending substantially radially therefrom and engageable with the first angle bar 38 of the lower rectangular portion 36 of the pan support frame 14 except when the pan support frame 14 is in the handling position 26. In other words, each of the first cams 94 is supported by the first shaft 90 for rotation in a first rotary direction 98 to move the lobe 96 thereof along the path of movement 20 of the pan support frame 14 generally in the first direction 22. Thus, as the first cams 94 are rotated in the first rotary direction 98 via the first shaft 90, each of the lobes 96 thereof will engage the first angle bar 38 of the lower rectangular portion 36 of the associated pan support frame 14, move the pan support frame 14 in the first direction 22 from the cooking position 24 to the handling position 26, and then disengage from the pan support frame 14 (see generally FIGS. 4 and 5).

The second cam assembly 86 is comprised of: a second shaft 100 rotatably mounted on the frame 16 substantially beneath the cooking position 24 of each of the pan support frames 14 via a plurality of bearing assemblies 102, so as to be substantially parallel to the first shaft 90; and a plurality of second cams 104 each axially mounted on the second shaft 100 substantially beneath the cooking position 24 of the selected one of the pan support frames 14. Each of the second cams 104 has a lobe 106 extending substantially radially therefrom and engageable with the second angle bar 40 of the lower rectangular portion 36 of the pan support frame 14 except when the pan support frame 14 is in the cooking position 24. In other words, each of the second cams 104 is supported by the second shaft 100 for rotation in a second rotary direction 108 to move the lobe 106 thereof along the path of movement 20 of the pan support frame 14 generally in the second direction 28. Thus, as the second cams 104 are rotated in the second rotary direction 108 via the second shaft 100, each of the lobes 106 thereof will engage the second angle bar 40 of the lower rectangular portion 36 of the associated pan support frame 14, move the pan support frame 14 in the second direction 28 from the handling position 26 to the cooking position 24, and then disengage from the pan support frame 14 (see generally FIGS. 4 and 5).

The motor assembly 88 is generally comprised of a motor 110 and a transmission assembly 112. The motor 110 is connected to the frame 16 via a bracket assembly 114 and to the first shaft 90 via a chain and sprocket assembly 116 to rotate the first shaft 90 in the first rotary direction 98. The speed of operation of the motor 110 may be varied via a control switch 118 mounted on the front cover 66.

The transmission assembly 112 is comprised of a first gear 120 axially mounted on the first shaft 90, a second gear 122 axially mounted on the second shaft 100, and a pair of idler gears 124 connected to the frame 16 via a cross brace member 126. As will be clear to those skilled in the art, the transmission assembly 112 is connected between the first shaft 90 and the second shaft 100 so as to transmit the rotation of the first shaft 90 to the second shaft 100, with the second shaft 100 rotating in the second rotary direction 108 when the first shaft 90 is rotating in the first rotary direction 98.

OPERATION OF THE PREFERRED EMBODIMENT

Before operating the crepe making apparatus 10, it is preferable that each of the first cams 94 be secured against rotation relative to the first shaft 90 by conventional means such as set screws, with each of the first cams 94 being secured such that the lobe 96 thereof is angularly spaced approximately 60° of arc from the lobe 96 of each of the adjacent first cams 94. In other words, the first cams 94 should be secured to the first shaft 90 such that the lobes 96, when viewed from the side cover 72, will present the impression of a spiral staircase the treads of which are ascending towards the side cover 72 in a clockwise manner. The second cams 104 should be secured to the second shaft 100 in a similar manner except that the lobes 106 of the second cams 104, when viewed from the side cover 72, will present the illusion of a spiral staircase the treads of which ascend towards the side cover 72 in a counter-clockwise manner. As will be clear to those skilled in the art, the angular phase difference between associated first and second cams 94 and 104, respectively, may be adjusted to vary the ratio between the first and second predetermined time periods.

In operation, each of the heating units 30 will be connected by conventional means to a suitable source of power such as a natural gas supply line. Each of the heating units 30 should then be actuated to provide a heating source for each of the crepe pans 12 to be disposed upon a respective one of the pan support frames 14.

Since each of the pan support frames 14 is moved along the horizontal path of movement 20 via the cooperating first and second cams 94 and 104, respectively, associated therewith, the following discussion will be limited to the operation of the crepe making apparatus 10 as regards a single pan support frame 14 with the understanding that each of the pan support frames 14 comprising the crepe making apparatus 10 operates in a substantially similar manner. Assuming therefore, for the purposes of discussion, that the selected pan support frame 14 is in the cooking position 24, the motor 110 should be connected to a suitable source of electrical operating power via the control switch 118 to rotate the first cam assembly 84 in the first rotary direction 98 via the chain the sprocket assembly 116 connected therebetween. Continued rotation of the first cam assembly 84 via the motor 110 will bring the lobe 96 of the first cam 94 into engagement with the first angle bar 38 of the lower rectangular portion 36 of the pan support frame 14. Further rotation of the first cam assembly 84 will cause the pan support frame 14 to be moved via the lobe 96 in the first direction 22 from the cooking position 24 towards the handling position 26. When the pan support frame 14 attains the handling position 26, further rotation of the first cam assembly 84 via the motor 110 will move the lobe 96 out of engagement with the first angle bar 38 of the lower rectangular portion 36 of the pan support frame 14.

At the same time that the motor 110 is rotating the first cam assembly 84 in the first rotary direction 98, the transmission assembly 112 is transmitting the rotation of the first shaft 90 in the first rotary direction 98 to the second shaft 100 so that the second shaft 100 rotates in the second rotary direction 108. After the pan support frame 14 has remained in the handling position 26 for the first predetermined time (which time is dependent upon the phase difference between the associated first and second cams 94 and 104, respectively, and the speed of operation of the motor 110 as determined by the control switch 118), rotation of the second cam assembly 86 via the motor 110 and transmission assembly 112 will bring the lobe 106 of the second cam 104 into engagement with the second angle bar 40 of the lower rectangular portion 36 of the pan support frame 14. Further rotation of the second cam assembly 86 will cause the pan support frame 14 to be moved via the lobe 106 in the second direction 28 from the handling position 26 toward the cooking position 24. After the pan support frame 14 has attained the cooking position 24, further rotation of the second cam assembly 86 will cause the lobe 106 to move out of engagement with the second angle bar 40 of the lower rectangular portion 36 of the pan support frame 14.

After the pan support frame 14 has remained in the cooking position 24 for the second predetermined time (which is again dependent upon the phase difference between the associated first and second cams 94 and 104, respectively, and the speed of operation of the motor 110 as determined by the control switch 118), the above described sequence of operations will repeat such that the pan support frame 14 will be moved in a generally reciprocating manner in the first direction 22 from the cooking position 24 to the handling position 26 and in the second direction 28 from the handling position 26 to the cooking position 24 with the pan support frame 14 being maintained in the handling position 26 for the first predetermined time and in the cooking position 24 for the second predetermined time. Since each of the first cams 94 is angularly spaced from the other first cams 94, and each of the second cams 104 are angularly spaced from the other second cams 104, the movement of the pan support frames 14, when viewed as in FIG. 1, will present the impression of a continuously moving wave pattern, with the speed of each cycle being determined via the control switch 118, and the intervals between cycles being determined by the phase difference between the associated first and second cams 94 and 104, respectively. Thus, the crepe making apparatus 10 operates in a manner which allows the operator to service one crepe pan at a time.

Changes may be made in the construction and the arrangement of the parts or the elements of the preferred embodiment as disclosed herein without departing from the spirit and scope of the invention as defined in the following claims.

What is claimed is:

1. An apparatus for use with a crepe pan for making crepes or the like, the apparatus comprising:
    a pan support frame for supporting the crepe pan;
    a frame having a substantially horizontal portion supporting the pan support frame for movement along a horizontal path of movement in a first direction from a cooking position to a handling position, and in a second direction substantially opposite to the first direction from the handling position to the cooking position;
    a heating unit connected to the frame, the heating unit being positioned to heat the crepe pan when the pan support frame is in the cooking position;
    first motive means for moving the pan support frame in the first direction from the cooking position to the handling position, the first motive means including:
        a first cam rotatably supported substantially beneath the handling position of the pan support frame, the first cam having a lobe extending substantially radially therefrom; and,
        means for supporting and rotating the first cam in a first rotary direction to move the lobe thereof along the path of movement of the pan support frame generally in the first direction, the lobe engaging the pan support frame for movement in the first direction from the cooking position to the handling position and then disengaging from the pan support frame;
    second motive means for moving the pan support frame in the second direction from the handling position to the cooking position; and,
    means coordinating the operation of the first and second motive means so that the pan support frame is maintained in the cooking position for a first predetermined time and in the handling position for a second predetermined time.

2. The apparatus of claim 1 wherein the second motive means is further defined to include:
    a second cam rotatably supported substantially beneath the cooking position of the pan support frame, the second cam having a lobe extending substantially radially therefrom; and,
    means for supporting and rotating the second cam in a second rotary direction to move the lobe thereof along the path of movement of the pan support frame in the second direction, the lobe engaging the pan support frame for movement in the second direction from the handling position to the cooking position and then disengaging from the pan support frame.

3. The apparatus of claim 1 wherein the pan support frame is further characterized as having a portion preventing the crepe pan from being inadvertently dislodged from the pan support frame.

4. The apparatus of claim 1 wherein the pan support frame is further characterized as having a plurality of wheels connected thereto to rollingly support the pan support frame for movement along the horizontal portion of the frame.

5. The apparatus of claim 4 wherein the means coordinating the operation of the first and second motive means is further defined to include:
 a motor connected to the frame and to the means for supporting and rotating the first cam to rotate said means for supporting and rotating the first cam in the first rotary direction; and,
 a transmission assembly connected between the means for supporting and rotating the first cam and the means for supporting and rotating the second cam to transmit the rotation of the means for supporting and rotating the first cam to the means for supporting and rotating the second cam, the transmission assembly rotating the means for supporting and rotating the second cam in the second rotary direction when the means for supporting and rotating the first cam is rotating in the first rotary direction.

6. The apparatus of claim 5 wherein the means coordinating the operation of the first and second motive means is further defined to include:
 means for varying the speed of operation of the motor.

7. An apparatus for use with a crepe pan for making crepes or the like, the apparatus comprising:
 a pan support frame for supporting the crepe pan;
 a frame having a substantially horizontal portion supporting the pan support frame for movement along a horizontal path of movement in a first direction from a cooking position to a handling position, and in a second direction substantially opposite to the first direction from the handling position to the cooking position;
 a heating unit connected to the frame, the heating unit being positioned to heat the crepe pan when the pan support frame is in the cooking position; and,
 motive means for moving the pan support frame in the first direction from the cooking position to the handling position and in the second direction from the handling position to the cooking position so that the pan support frame is maintained in the cooking position for a first predetermined time and in the handling position for a second predetermined time, the motive means including:
 a first shaft rotatably mounted on the frame substantially beneath the handling position of the pan support frame, the shaft being rotatable about a horizontal axis intersecting substantially perpendicularly the downward vertical projection of the path of movement of the pan support frame;
 a first cam axially mounted on the first shaft substantially beneath the handling position of the pan support frame, the first cam having a lobe extending substantially radially therefrom and engageable with a first predetermined portion of the pan support frame except when the pan support frame is in the handling position;
 a second shaft rotatably mounted on the frame substantially beneath the cooking position of the pan support frame and substantially parallel to the first shaft;
 a second cam axially mounted on the second shaft substantially beneath the cooking position of the pan support frame, the second cam having a lobe extending substantially radially therefrom and engageable with a second predetermined portion of the pan support frame except when the pan support frame is in the cooking position;
 a motor connected to the frame and to the first shaft to rotate the first shaft in the first rotary direction; and,
 a transmission assembly connected between the first shaft and the second shaft to transmit the rotation of the first shaft to the second shaft, the transmission assembly rotating the second shaft in the second rotary direction when the first shaft is rotating in the first rotary direction.

8. The apparatus of claim 7 wherein the motive means is further defined to include:
 means for varying the speed of operation of the motor.

* * * * *